United States Patent [19]

Ushiro et al.

[11] Patent Number: 5,345,282
[45] Date of Patent: Sep. 6, 1994

[54] FOLDABLE OPTICAL APPARATUS

[75] Inventors: Seimei Ushiro; Bunsuke Emura, both of Tokyo, Japan

[73] Assignee: Fuji Photo Film Co., Ltd., Kanagawa, Japan

[21] Appl. No.: 45,232

[22] Filed: Mar. 23, 1993

[30] Foreign Application Priority Data

Mar. 23, 1992 [JP] Japan .................................. 4-065268

[51] Int. Cl.$^5$ .............................................. G03B 21/14
[52] U.S. Cl. ........................................ 353/119; 353/63
[58] Field of Search ....................... 353/65, 66, 63, 64, 353/DIG. 4, DIG. 3, 119, 88, 97

[56] References Cited

U.S. PATENT DOCUMENTS

| | | | |
|---|---|---|---|
| 2,944,461 | 7/1960 | Howell et al. | 353/DIG. 3 |
| 4,588,271 | 5/1986 | Emura | 353/66 |
| 4,921,343 | 5/1990 | Ushiro et al. | 353/66 |
| 4,938,587 | 7/1990 | Namioka et al. | 353/66 |

Primary Examiner—William A. Cuchlinski, Jr.
Assistant Examiner—William C. Dowling
Attorney, Agent, or Firm—Young & Thompson

[57] ABSTRACT

An optical apparatus, e.g. a foldable overhead projector of the reflection type, includes a base table, whereon original material is placed on a Fresnel mirror. A projector head forms an image of the original material. A stand is swung on the base table. The stand, when folded, overlies a control portion of the Fresnel mirror. The projector head is vertically swingable on a distal end of the stand. A stand locking lid is swingably mounted on the stand distal end. Retaining claws are formed at a front of the locking lid. Receiving recesses in the base table retain the retaining claws, and keep the stand folded. The locking lid has a manually pullable edge, which is pulled to disengage the retaining claws from the receiving recesses. The projector is thus erected and folded easily, because it is openable quickly for erection. A pair of plates are swingable beside the base table between open and closed positions, to cover lateral margins of the Fresnel mirror when closed, and lie flush with the Fresnel mirror when opened. A storage chamber in the base table contains a plurality of original materials, and is covered by the vertically swingable Fresnel mirror. Two rollers under the base table and close to a front edge facilitate transportation of the base table as raised in a position opposite to the rollers.

31 Claims, 9 Drawing Sheets

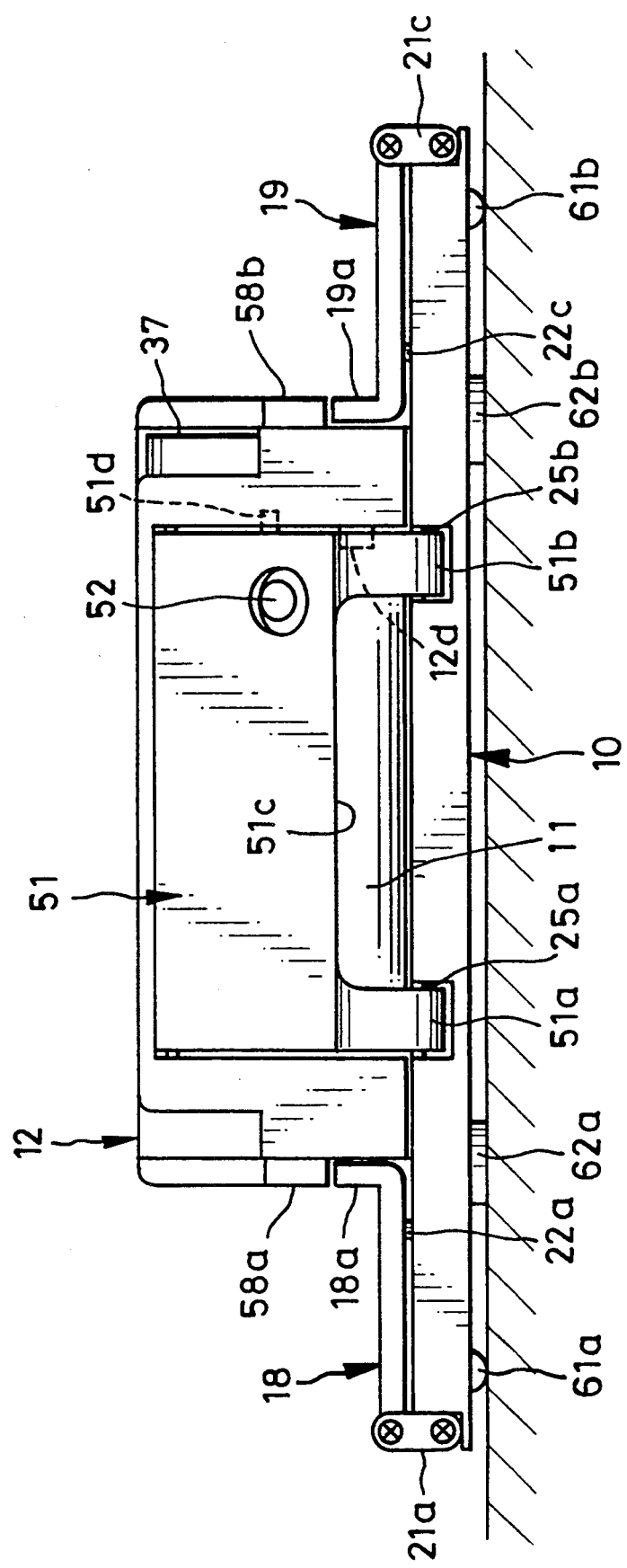

FOLDABLE OPTICAL APPARATUS

BACKGROUND OF THE INVENTION

1. Field of the Invention

The present invention relates to a foldable optical apparatus, for example an overhead projector, and more particularly relates to an optical apparatus of improved portability.

2. The Prior Art

There is a known foldable optical apparatus such as an overhead projector, which is advantageous as to portability as it can be folded so as to be of compact size. Such an overhead projector has a removable covering for protection against dust. To use the projector, the covering is first removed. A support or stand is erected and locked in a predetermined erected position above a stage that supports the material whose image is to be projected. The top of the stand swingably supports an image forming head or projector head which incorporates a projecting section and a light source. The projector head, when folded, is contained within the stand. The projector head is substantially parallel to the stage. The stage is constituted by a Fresnel mirror consisting of a Fresnel plate and a reflective layer formed thereon. On the Fresnel plate, there is placed an original of the material, namely a transparency on which an opaque image is written or drawn. To project the image on a screen remote from the apparatus, light emitted by the light source is directed to the Fresnel mirror. Transmitted through the original material, the light is reflected upward by the Fresnel mirror to illuminate the original material from below. The light of the image of the original material passes through a projector lens and to a projector mirror, both carried by the projector head and proceeds to the screen.

This conventional overhead projector has a problem in that removal and attachment of the covering of the apparatus is so laborious and time consuming that it is difficult to set up or store the projector quickly. The covering is so large that use of the projector requires extra space for storing the covering, and this is a drawback when using the projector in a confined space such as the surface of a small desk. Moreover, the size of the covering decreases the portability of the projector, as it adds considerable length, width and thickness to the projector.

The Fresnel mirror has an area the size of the largest original material to be projected. There is a drawback, because when original material smaller than the largest possible is placed on the Fresnel mirror, extra light is transmitted around the original material, so that the stage is excessively lighted and is glaring to the eyes of a user. Moreover, image projected on the screen is surrounded by brilliant marginal areas which are also glaring to viewers of the screen.

OBJECTS OF THE INVENTION

In view of the foregoing problems, an object of the present invention is to provide a foldable optical apparatus which can be set up, and folded, with great ease.

Another object of the present invention is to provide a foldable optical apparatus of which the size is reduced.

A further object of the present invention is to provide a foldable optical apparatus wherein light illuminating original material to be viewed is prevented from causing excessive glare to the eyes of users and viewers.

Still another object of the present invention is to provide a foldable optical apparatus whose installed position can be adjusted precisely and appropriately.

An additional object of the present invention is to provide a foldable optical apparatus wherein original materials to be viewed are prevented from causing an excessive additional load when the optical apparatus is transported with the original materials.

SUMMARY OF THE INVENTION

In order to achieve the above and other objects and advantages of this invention, a foldable optical apparatus according to the present invention includes a base table, which has a stage on which original material is placed. An image forming head forms an image of the original material on the stage, and includes at least an optical system. Support means has first and second end portions, the first end portion being mounted on the base table for vertical swinging movement between an erected position and a folded position in which the support means overlaps the stage, the image forming head being mounted for vertical swinging movement on and relative to the second end portion. A first locking structure fixes the support means in the folded position, and includes a locking member, which is mounted swingably on the second end portion of the support means. A retaining claw portion is formed at a free end of the locking member. A receiving portion is formed on the base table for engagement with the retaining claw portion. Release means releases the engagement between the retaining claw portion and the receiving portion.

Accordingly, the novel optical apparatus can be set up, and folded, with great ease because it requires no large covering and is openable quickly for erection.

In a preferred embodiment, a pair of swingable plates are arranged on two opposite sides of the base table to be swingable between open and closed positions, the swingable plates covering the stage when in the closed position, together with the support means as folded, and forming extension surfaces of the upper surface of the stage when in the open position. The foldable optical apparatus can thus have a reduced size, and light illuminating the original material is prevented from causing excessive glare to the eyes of users and viewers.

There is arranged a Fresnel mirror where the original material is placed. The Fresnel mirror is mounted on the base table for reflecting light from the light source toward the projector head. A storage chamber contains a plurality of original materials in the base table, and is covered by the Fresnel mirror. Original materials for use in the apparatus and thus prevented from adding excessive weight when the optical apparatus is transported with the original materials thus stored.

Furthermore, at least one roller is arranged on the bottom of the base table and close to an edge of the base table for facilitating transportation of the base table with the bottom of the base table tilted. The installed position of the novel apparatus can be adjusted precisely and appropriately with great ease.

BRIEF DESCRIPTION OF THE DRAWINGS

The above objects and advantages of the present invention will become apparent from the following detailed description when read in connection with the accompanying drawings, in which:

FIG. 8 is a front elevational view illustrating the projector as folded; and

DETAILED DESCRIPTION OF THE PREFERRED EMBODIMENTS

Figure 1:
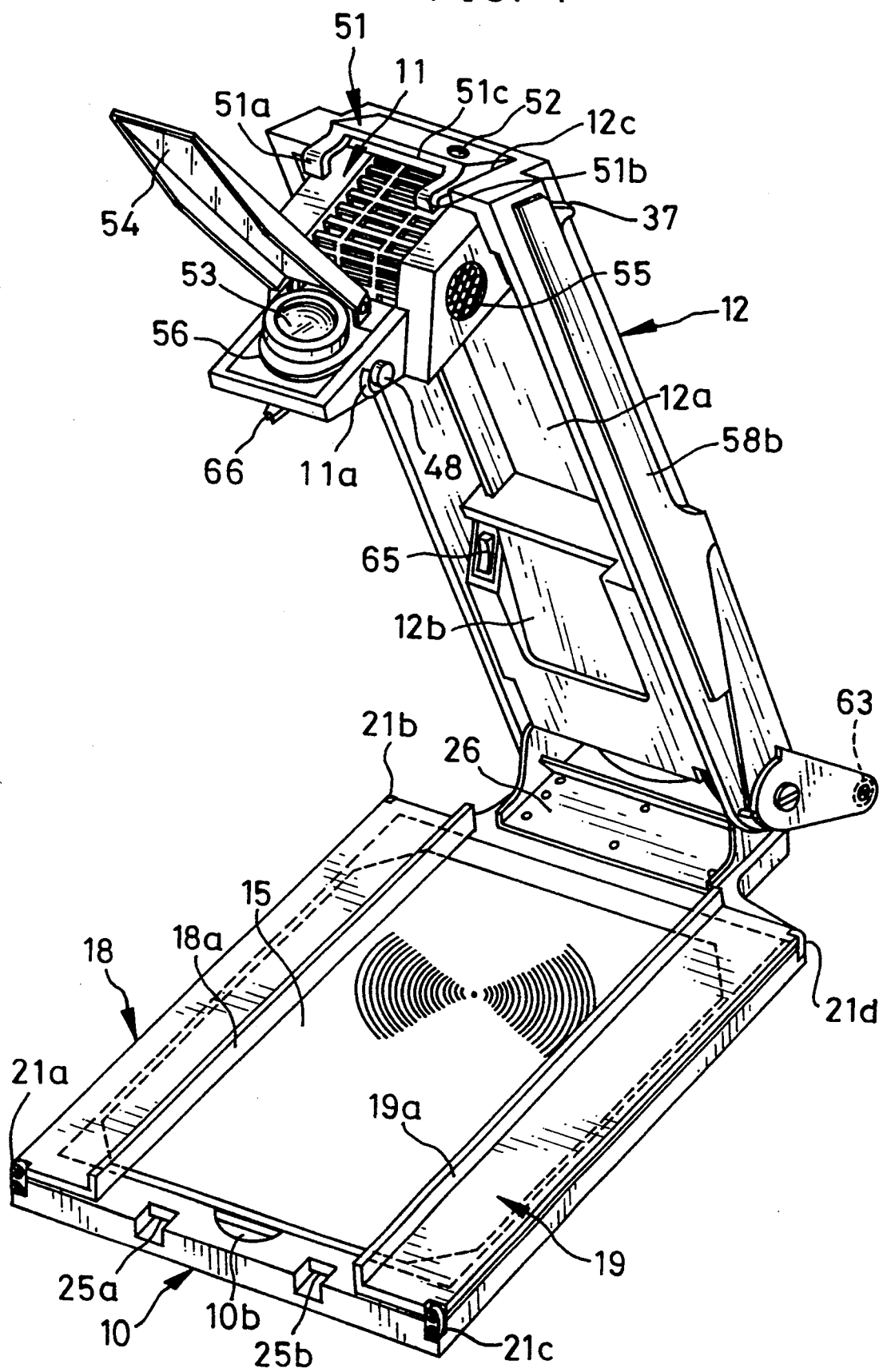
FIG. 1 is a perspective view illustrating an overhead projector according to the present invention.

FIG. 1 illustrates an overhead projector of the reflection type. A projector head 11 is arranged above a base table 10, and incorporates a projecting section and a light source section. On one edge of the base table 10 is arranged a stand 12, which is displaceable between an unfolded, erected position and a folded, collapsed position, of which the former is depicted in FIG. 1. In the folded position, the stand 12 is folded substantially until contact with the base table 10. To the stand 12 is swingably secured the projector head 11. When the projector head 11 is swung to the folded position, it is received in a head chamber 12a formed in the stand 12.

Figure 2:
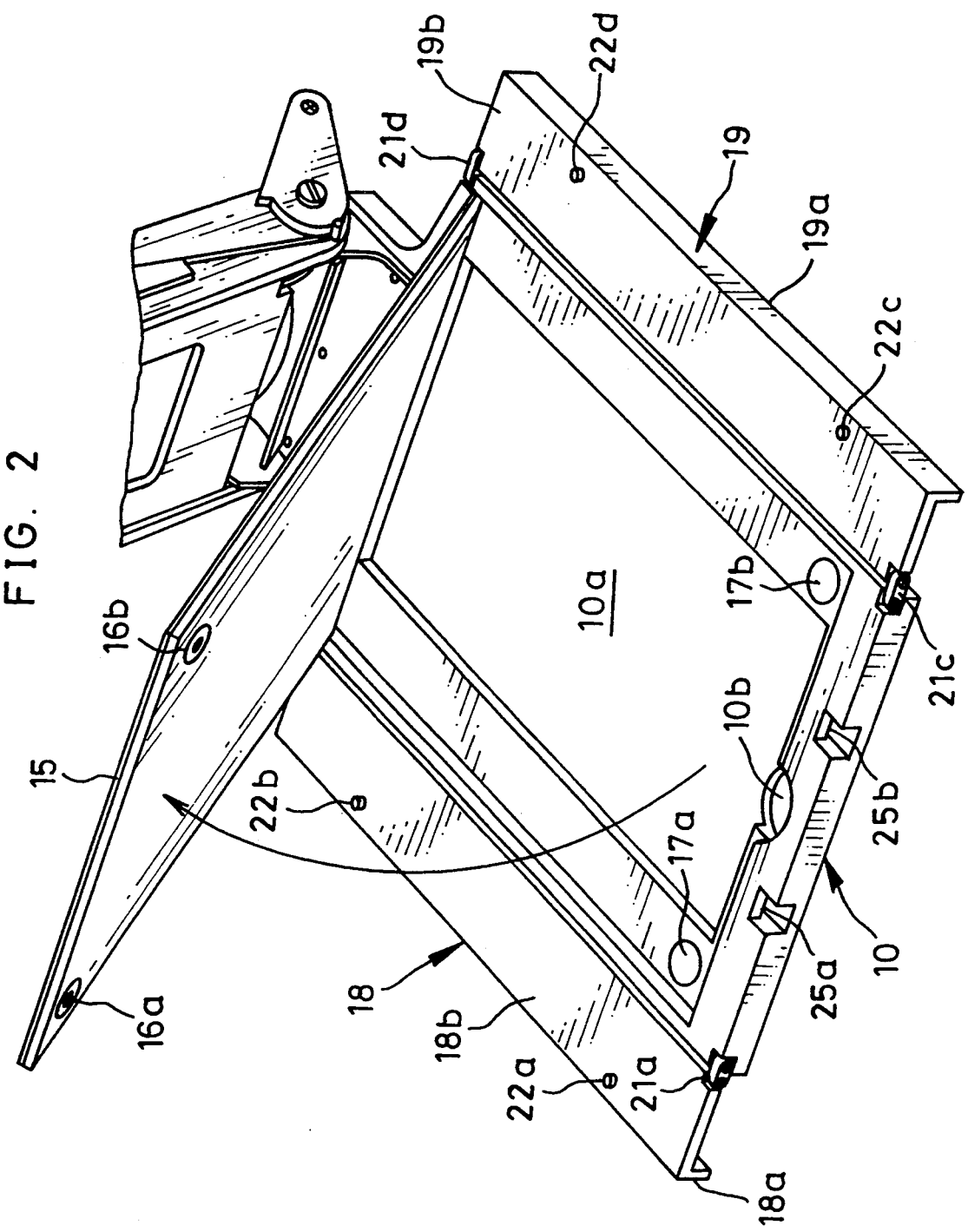
FIG. 2 is a perspective view, partly broken away, illustrating a chamber in the projector for containing original materials to be projected.

As illustrated in FIG. 2, the base table 10 has a generally box-like but very thin shape. There is mounted a Fresnel mirror 15 on the base table 10 as a stage for bearing original material 24. Mirror 15 is supported on the base table 10 to be swingable vertically on a shaft extending along the same side as stand 12. The original material 24 is a transparency having opaque images thereon, and is supported on the Fresnel mirror 15. Beneath the Fresnel mirror 15, the base table 10 is provided with a storage chamber 10a for originals, e.g. up to 20 originals having A4 size. To keep the storage chamber 10a closed against inadvertent opening, the Fresnel mirror 15 is releasably secured closed by magnetic force: the bottom of the Fresnel mirror 15 is provided with iron disks 16a and 16b, which are attracted by magnets 17a and 17b on opposite sides of the storage chamber 10a. Shown at 10b is a circular recess communicating with the storage chamber 10a. The user inserts a finger into recess 10b in order to raise manually the free edge of the Fresnel mirror 15 so as to open the storage chamber 10a. Note that the Fresnel mirror 15 is eccentric such that its optical center is deviated close to a shaft 27 (FIG. 4) which passes through the lower end of the stand 12. This positioning of the optical center is adapted to reflect the light from the light source section toward the projecting section so as to illuminate the original material 24 with good efficiency, despite the displacement of the optical axis relative to the light source section and the projecting section.

Both lateral sides of the base table 10 are provided with vertically swingable plates 18 and 19. The swingable plate 18 is connected to the base table 10 by double hinges 21a and 21b. The swingable plate 19 is connected to base table 10 by double hinges 21c and 21d. When swung toward the Fresnel mirror 15, the swingable plates 18 and 19 cover two opposite sides of the Fresnel mirror 15 as illustrated in FIG. 1. To project an image of original material 24 which is smaller than the Fresnel mirror 15, e.g. an A4 original, the marginal areas on the Fresnel mirror 15 outside the A4 range are covered by the swingable plates 18 and 19 to shade the corresponding marginal areas on the screen. The plates 18 and 19 have lengthwise flanges 18a and 19a, which rest on the support surface of the projector, e.g. a desk surface, when the plates 18 and 19 are fully open. The flanges 18a and 19a support the plates 18 and 19 so that upper surfaces 18b and 19b of the plates 18 and 19 are flush with the Fresnel mirror 15 and thus are lateral extensions of the base table 10.

The plate surfaces 18b and 19b are provided with two pairs of positioning pads 22a to 22d which regulate the position of the original material 24. When the plates 18 and 19 are closed to overlap the stage, the pads 22a to 22d come into contact with the surface of the Fresnel mirror 15, and define gaps 23 (FIG. 3) which are wide enough for receiving one or two sheets of original material. The opposite pairs of pads 22a and 22c, 22b and 22d when resting on the stage are spaced in accordance with the width of the possible original material 24, e.g. of A4 size. Insertion of the original material 24 into the gaps 23 enables the original material 24 to be located exactly at the widthwise middle of the Fresnel mirror 15. The pads 22a to 22d are secured to the plates 18 and 19, and formed e.g. from rubber, in order that the Fresnel mirror 15 will not be damaged by contact with the pads 22a to 22d.

The forward edge of the base table 10 is provided with two receiving recesses 25a and 25b for use in locking of the projector head 11 down on the base table 10.

Figure 3:
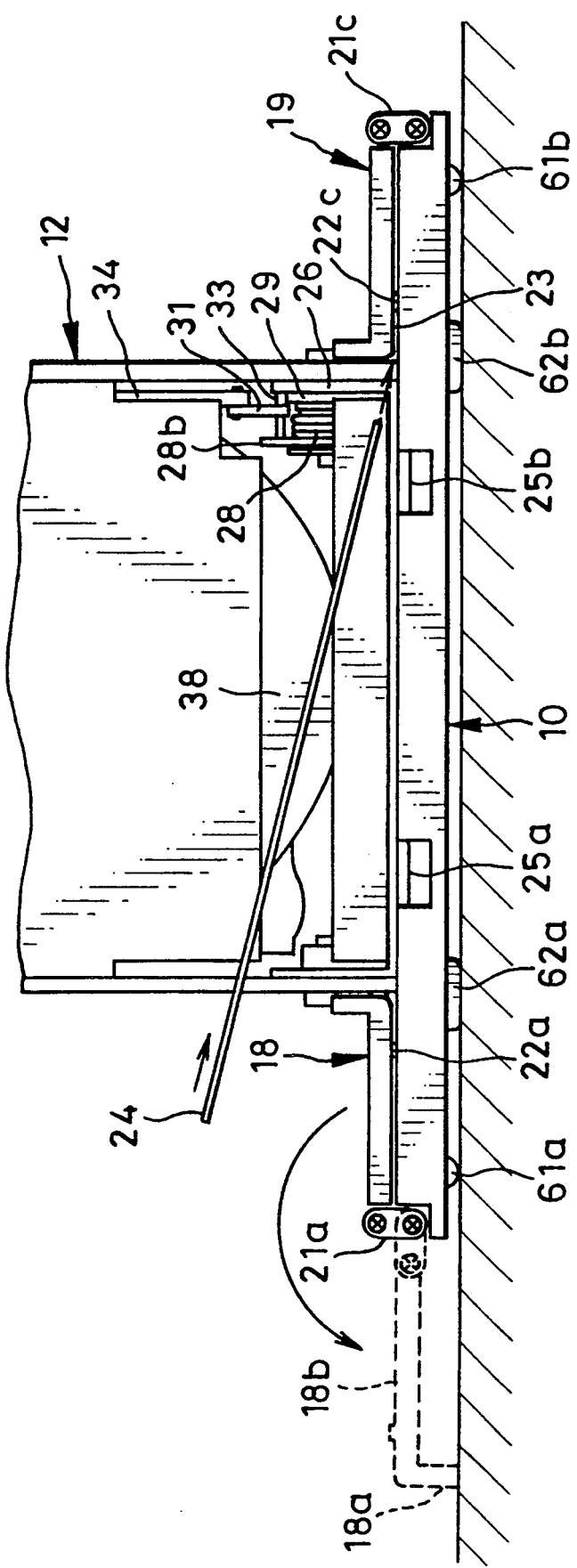
FIG. 3 is a front elevational view, partly broken away, illustrating the projector in which original material is being placed.
Figure 4:
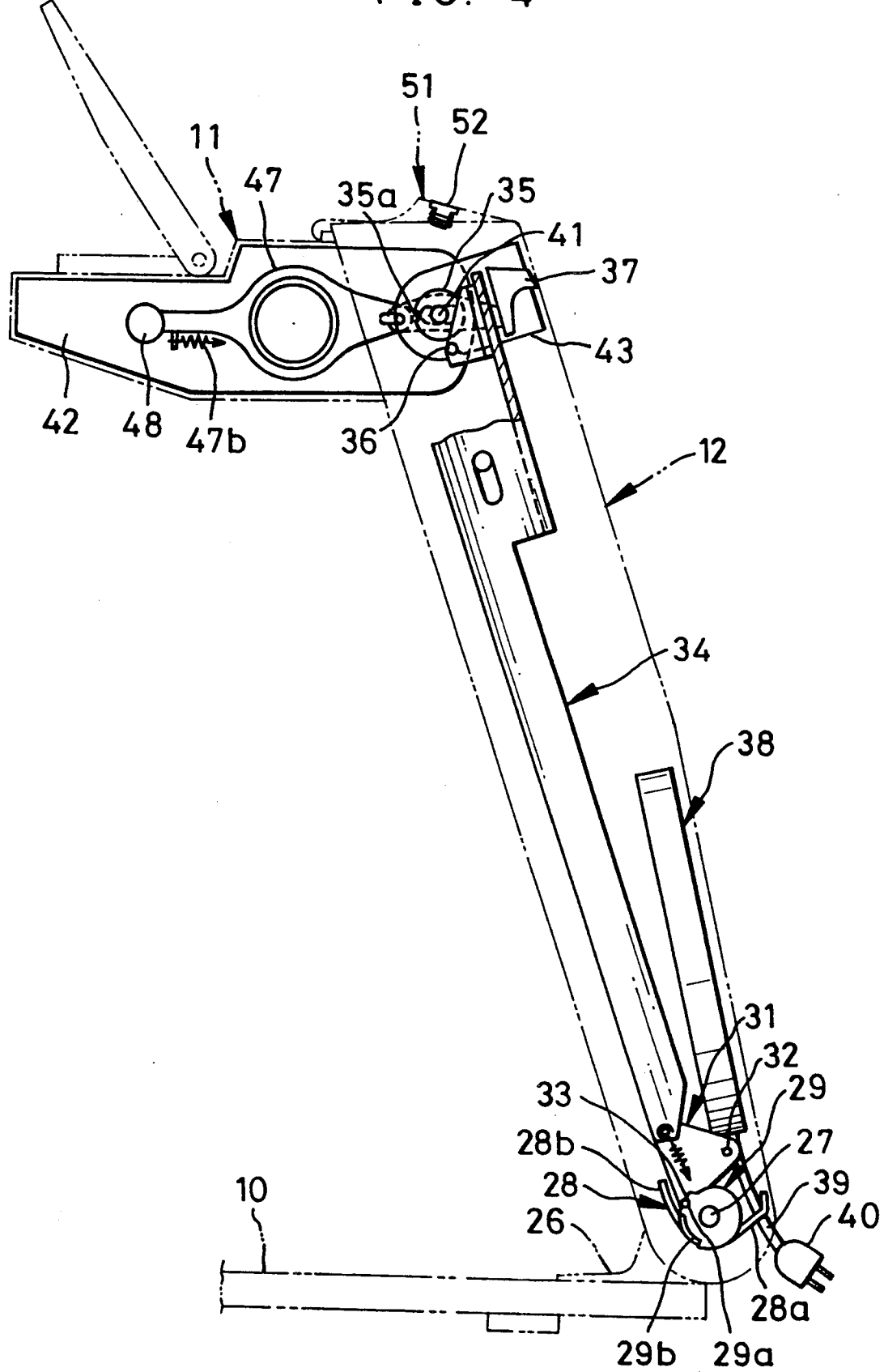
FIG. 4 is an explanatory view in side elevation illustrating the folding mechanism of the projector.

The stand 12 has a width such that it overlaps only the middle of the Fresnel mirror 15 and but also is wider than the projector head 11. Bearing brackets 26 secured on the base table 10 bear the shaft 27 which supports the stand 12 vertically swingably. Around the shaft 27, as shown in FIGS. 3 and 4, there are mounted a torsion coil spring 28 and a disk or hub 29. A rear end 28a of the torsion coil spring 28 is fixed on an inner face of the stand 12. A front end 28b of the torsion coil spring 28 is directed in the longitudinal direction of the stand 12. The disk 29 has a notch 29a and an arcuate recess 29b, and is fixedly attached to the shaft 27. Beside the disk 29, a triangular member 31 is supported axially on a shaft 32, and is provided with a pin 3 adapted to selectively engage with the notch 29a and the recess 29b. The spring 28 is in frictional contact with the shaft 27.

A shiftable arm 34 is swingably secured to the triangular member 31. The portion of the arm 34 secured to the triangular member 31 is biased by a spring downward toward the shaft 27. The arm 34 is shiftable relative to the stand 12 generally in a direction lengthwise of the stand 12. The upper end of the arm 34 is provided with a pin 36 and a button 37. The pin 36 is adapted to engage with a notch 35a formed in an inner disk or hub 35. The button 37 is manually operable in order to fold the stand 12. Note that the disk 35 and the top of the arm 34 are actually hidden behind an outer hub or disk 43, but are indicated by solid lines in FIGS. 4 and 5 for easy understanding.

The bottom of the stand 12 incorporates a cable reel 38. A power cable 39 for supplying power to a halogen lamp 11a is rolled on the cable reel 38 and thus contained in the overhead projector. The cable reel 38 is so constructed that the cable 39 is withdrawable to a desired length of 2 meters at most, and so that an abrupt release of the cable 39, immediately following a short pull on the cable 39, causes the cable reel 38 fully to wind up the cable 39, in conventional fashion.

Figure 5:
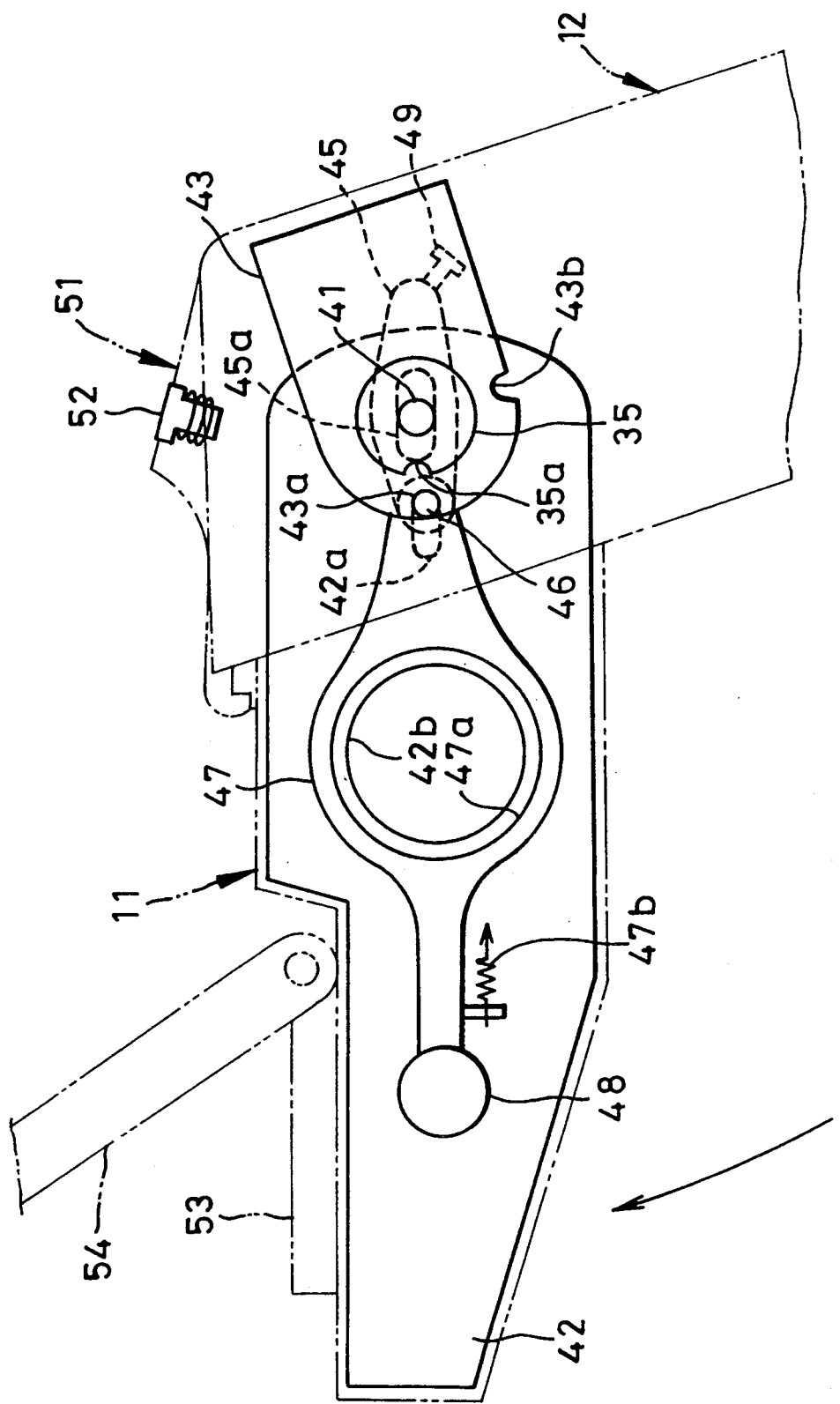
FIG. 5 is an enlarged fragmentary view in side elevation illustrating the projector head and the associated folding mechanism.
Figure 6:
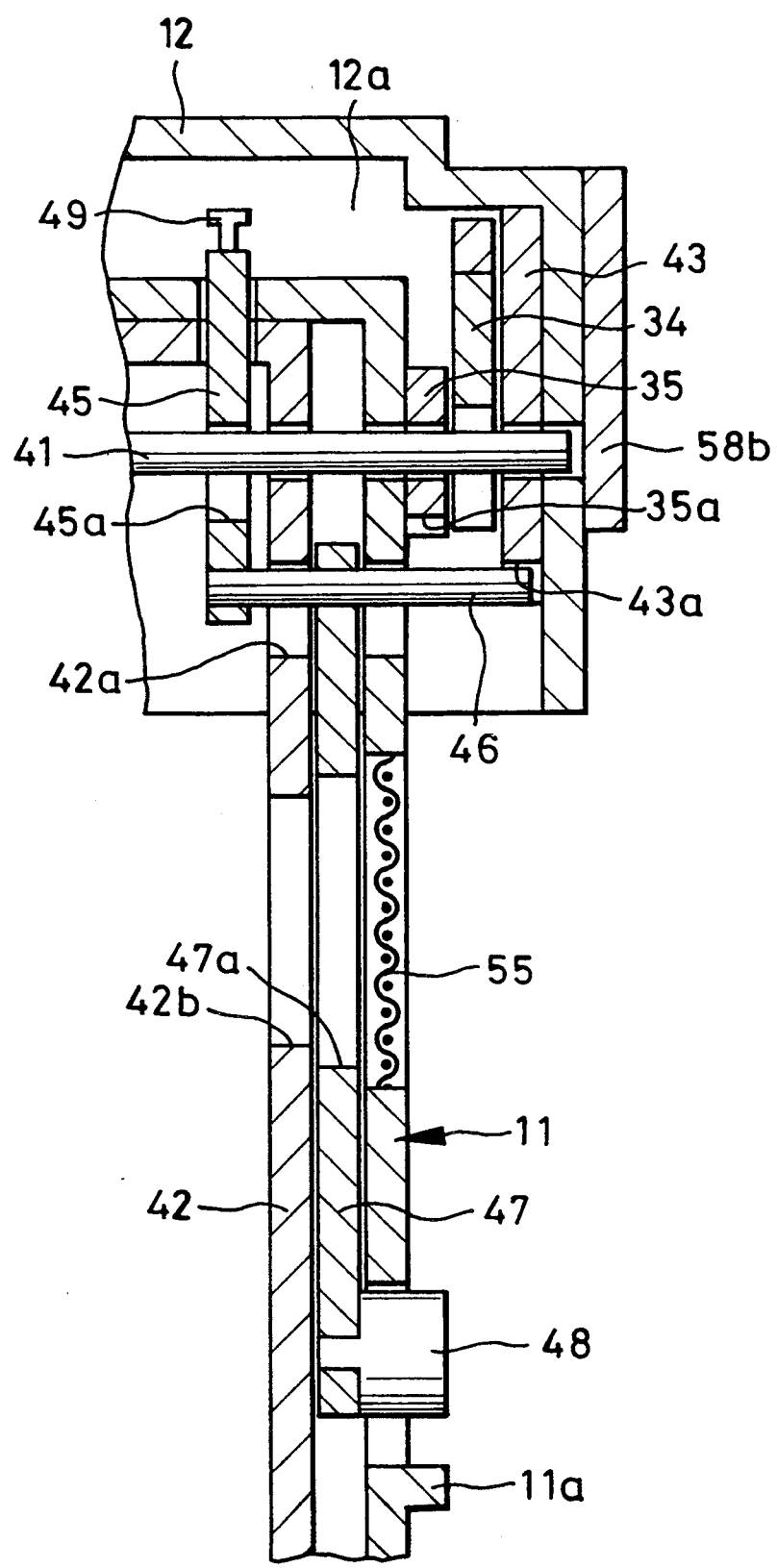
FIG. 6 is a fragmentary horizontal sectional view illustrating the projector head and the folding mechanism.

Referring now to FIGS. 5 and 6, a head shaft 41 passes through a chassis 42 and a distal end of the stand 12. The inner disk 35 is fixedly secured on the chassis 42 concentric with the head shaft 41. An outer hub or disk 43 is fixedly mounted on the stand 12 inside the head chamber 12a, and is swingable about the head shaft 41. A slider 45 has a slot 45a, through which the head shaft 41 is inserted so as to support the slider 45 slidably relative to the chassis 42. A pin 46 is secured on the slider 45 and is inserted through a slot 42a in the chassis 42 and is received in a slider 47. The slider 47 is slidable lengthwise of the chassis 42. The chassis 42 and the slider 47 have respective ventilation openings 42b and 47a overlying each other.

The slider 47 is biased toward the head shaft 41 by a spring 47b. When the projector head 11 is swung upwardly as indicated by the arrow in FIG. 5, the pin 46 is received in a notch 43a formed in the outer disk 43, so as releasably to lock the projector head 11 in the erected position shown in FIG. 5. The slider 47 is provided with a rounded button 48. When a user pulls the button 48 forwardly against the bias of the spring 47b, the pin 46 is disengaged from the notch 43a so as to release the projector head 11, which is now foldable into the head chamber 12a (see FIG. 1) in the stand 12. When the head chamber 12a receives the projector head 11, the pin 46 is received in another notch 43b in the outer disk 43 so as releasably to lock the projector head 11 in the folded position. Note that, as seen in FIG. 1, the outside of the projector head 11 is provided with an arcuate ridge 11a in front of the button 48. The ridge 11a limits forward movement of the button 48 and is so positioned that a user can put his thumb or finder on it when the button 48 is pulled forward.

The rear of the slider 45 is provided with a projection 49. When the projector head 11 is folded and received in the head chamber 12a, the projection 49 responsively rotates into contact with the lower end of an unlocking button 52. The unlocking button 52 is mounted on and extends through a stand locking lid 51. With the projector head 11 in the head chamber 12a, the unlocking button 52 is first depressed to release the projector head 11 from the head chamber 12a. Specifically, depression of the unlocking button 52 pushes the projection 49, slides down the slider 45, and then disengages the pin 46 from the notch 43b. Note that the locking lid 51 is adapted to retain the stand 12 folded down on the base table 10, as will be described later in detail. For easy understanding, the shiftable arm 34, pin 36 and button portion 37 are omitted from FIG. 5.

In the projector head 11, the light source section is constituted by the halogen lamp 11a, a condenser lens (not shown), and a mirror (not shown) facing rearwardly and downwardly. The halogen lamp 11a emits bright light. The condenser lens orients the light suitably for the Fresnel pattern on the Fresnel mirror 15. Incorporated in the projector head 11 as well, the projecting section is constituted by a projector lens 53 and a projector mirror 54, as seen in FIG. 1. The projector lens 53 effects focussing of the light from the Fresnel mirror 15. The projector mirror 54 reflects the light from the projector lens 53 toward the screen. There are arranged two cooling fans (not shown) beside the halogen lamp 11a for cooling the lamp 11a, one for intake and the other for exhaust, both through the ventilation openings 42b and 47a. In correspondence with the ventilation openings 42b and 47a, the walls of the projector head 11 are provided with similar ventilation openings, over which screens 55 are mounted. Note that the projector lens 53 is a zoom lens of which the focal length is changeable from 285 to 315 nm.

The projector mirror 54 is not only vertically swingable, but also horizontally rotatable, and for this purpose is secured to a ring 56, which is rotatable around the projector lens 53, as illustrated in FIG. 1. Rotational adjustment of the projector mirror 54 through the ring 56 changes the direction of projection from the mirror 54 as desired. Folding of the projector mirror 54 down on the projector head 11 enables the head chamber 12a to receive the projector head 11 while a mirror receiver 12b in the stand 12 receives the projector mirror 54.

Figure 7:
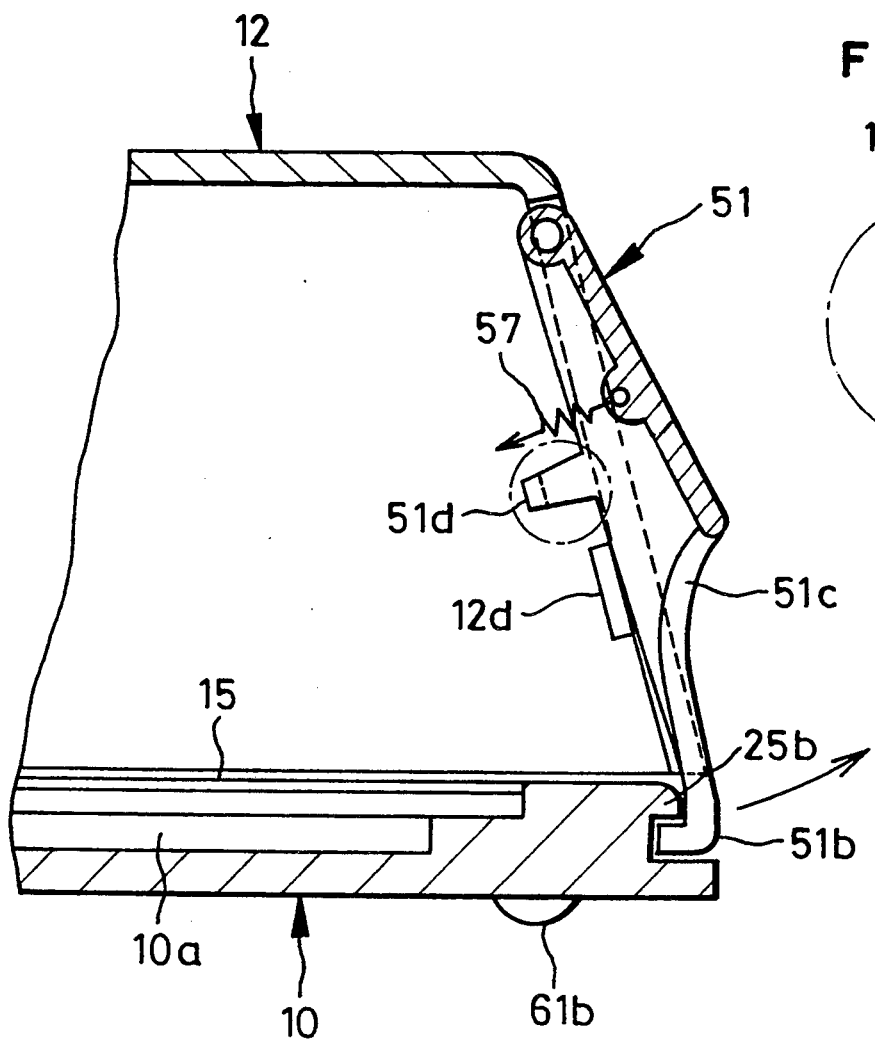
FIG. 7 is an explanatory fragmentary view in cross section, illustrating the projector head as locked by a locking lid.
Figure 7A:
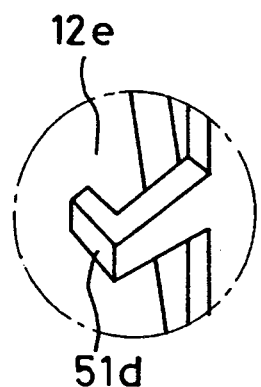

In FIGS. 1, 7 and 8, it will be seen that the locking lid 51 is swingably supported within a recess 12c through which the head chamber 12a in the stand 12 opens. The locking lid 51 is biased by a spring 57 inwardly of the head chamber 12a. The free end of the locking lid 51 is provided with two retaining claws 51a and 51b, which are adapted to engage in the recesses 25a and 25b. The retaining claws 51a and 51b define between them a recess, of which the edge constitutes a portion 51c adapted to be pulled by a finger of the user. A lateral edge of the locking lid 51 is provided with an L-shaped stopper claw 51d. When the locking lid 51 is swung open against the bias of the spring 57 after disengagement of the retaining claws 51a and 51b, the stopper claw 51d comes into contact with an inside edge 12e of the recess 12c. The contact of the stopper claw 51d with the inside edge 12e prevents the locking lid 51 from opening excessively, that is, beyond a range of movement sufficient to disengage locking lid 51 from base table 10.

A projection 12d projects from the inside edge 12e of the recess 12c. When the locking lid 51 is swung into the recess 12c under the bias of the spring 57, the projection 12d comes in contact with the corresponding lateral side of the locking lid 51. The contact of the projection 12d with the locking lid 51 prevents the locking lid 51 from moving farther toward the head chamber 12a than is necessary for receiving the stand 12 on the base table 10. Note that the projection 12d may be on the opposite side from the claw 51d relative to the lid 51. The projector head 11 is omitted from FIG. 7 for convenience, but is actually contained in the stand 12.

As can be seen in FIGS. 1 and 8, there are provided lateral panels 58a and 58b on the stand 12. When the stand 12 is folded, edges of the panels 58a and 58b come into contact with the flanges 18a and 19a, and keep the plates 18 and 19 from swinging when the projector is folded.

Figure 9:
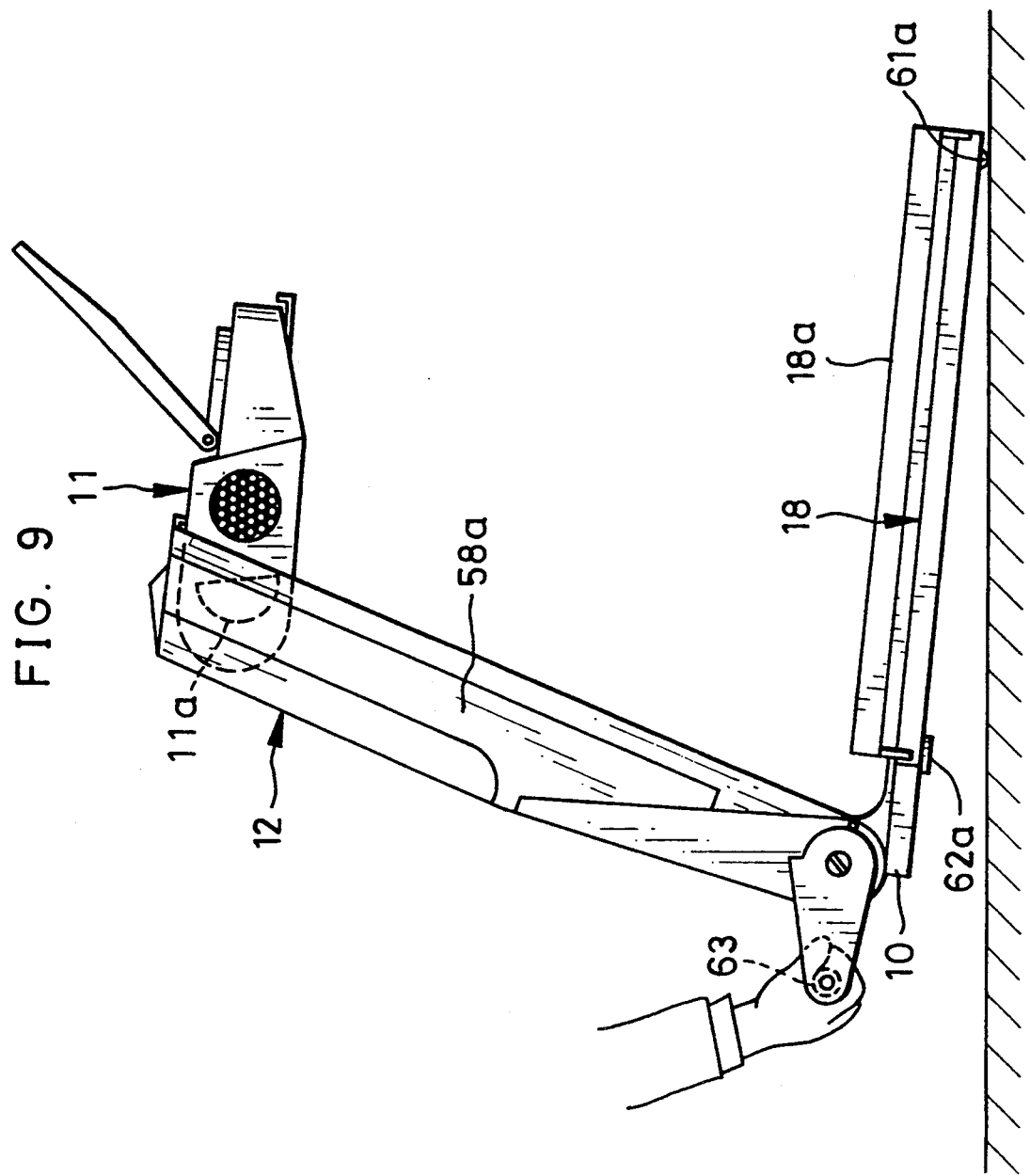
FIG. 9 is a side elevational view illustrating the projector during transportation on a desk.

As illustrated in FIGS. 3, 8 and 9, the forward end of the bottom of the base table 10 is provided with ball-shaped casters or rollers 61a and 61b. The rear end of the bottom of the base table 10 is provided with stopper pads 62a and 62b, e.g. of rubber, to contact the supporting surface with high friction. The shaft 27 of the stand 12 is provided with a grip 63. When the grip 63 is manually raised, the stopper pads 62a and 62b are raised from the supporting surface so that the projector is supported on that surface only by the rollers 61a and 61b, so that the projector can be rolled along the supporting surface.

In FIG. 1, a power switch is shown at 65. An adjuster lever is shown at 66, whose manual swinging moves the projector lens 53 vertically and thereby effects adjustment of the focus so as to project a well-focussed image on the screen. For convenience of illustration, the adjuster lever 66 is omitted from FIGS. 4 and 5.

The operation of the novel overhead projector will now be described. With the folded projector installed on a horizontal surface of e.g. a desk, a finger of a user is inserted under the locking lid 51 at the pullable portion 51c, and pulls the portion 51c. The retaining claws 51a and 51b are disengaged from the receiving recesses 25a and 25b. The stopper claw 51d abuts the inside edge 12e. Further pulling on the locking lid 51 erects the stand 12 by application of force to the stopper claw 51d. In FIG. 4, the rear end 28a of the torsion spring 28 is rotated clockwise with the stand 12 axially around the base shaft 27, so that the turns of the torsion spring 28 expand to a looser winding. The tightness of the torsion spring 28 around the base shaft 27 is thus so lowered as to reduce the friction of the spring 28 on the shaft 27. Because of this, the stand 12 is manually erected with less force. Swung to the erected position, the stand 12 is locked by reception of the pin 33 in the notch 29a.

When the unlocking button 52 is next depressed, the projection 49 is pushed down by the lower end of the button 52. The slider 45 is slid toward the forward end of the projector head 11 against the spring 47b of the slider 47. The pin 46 is disengaged from the notch 43b to unlock the projector head 11. As seen in FIG. 4, the bottom of the projector head 11 is manually grasped and swung clockwise around the shaft 41, until the projector head 11 is locked by engagement of the pin 46 in the notch 43a in the erected position, wherein the projector head 11 is held substantially parallel to the base table 10. The button 37, although adapted to fold the stand 12, is hindered from sliding up, by contact of the pin 36 with the round portion of the inner disk 35. Accordingly the stand 12 cannot be folded accidentally while the projector head 11 is locked in the erected position. The projector mirror 54 is raised at an appropriate angle. The cable 39 is pulled out of the cable reel 38. A plug 40 of the cable 39 is connected to an electric outlet.

Original material 24 is placed on the Fresnel mirror 15. One longer side of the original material 24 is inserted in the gap 23. When the original material 24 is of A4 size, both its longer sides contact the positioning pads 22a to 22d, so that the original material is positioned on the Fresnel mirror 15 in a well-centered condition. If the original material 24 is larger than A4 size, the swingable plates 18 and 19 are swung open laterally so as to receive the full area of the original material 24.

When the original material 24 is thus positioned, the power switch 65 is turned on. The halogen lamp 11a within the projector head 11 is lit. Light emitted by the lamp 11a is condensed by the condenser lens, and directed to the Fresnel mirror 15. Transmitted through the original material 24, the light is reflected upward by the Fresnel mirror 15 to illuminate the original material 24 from below. The image of the original material 24 passes through the projector lens 53 to the projector mirror 54, and is projected onto the remote screen. When observing the projected image, the quality of the image is adjusted as to magnification and focussing of the projector lens 53 and the angle of the projector mirror 54, so as to improve the size and focus and to eliminate distortion of the image. If such adjustment is insufficient to improve the projected image, the position of the overhead projector is bodily adjusted as to its angle relative to and distance from the screen. To do this, the grip 63 is manually held to raise the rear of the projector, as illustrated in FIG. 9. Either or both of the rollers 61a and 61b can be rolled on the supporting surface by applying only a small manual force in order to adjust the orientation of the projector precisely. After thus moving the projector, the quality of the image can be adjusted properly, whereupon the projector executes optimum projection.

When the user finishes using the projector, it is folded. First, the projector mirror 54 is folded to overlie the projector lens 53 in the lengthwise direction of the projector head 11. The user applies his or her thumb to the ridge 11a, and his or her index finger to the button 48, and pulls the button 48 toward the ridge 11a. The pin 46 is disengaged from the notch 43a so as to release the projector head 11 from being locked in the erected position. With no hindrance to a counterclockwise manual push on the projector head 11, the projector head 11 is swung down about the shaft 41. When the projector head 11 is forcibly pressed against the stand 12, the projector head 11 is received within the head chamber 12a while the projector mirror 54 is received within the mirror receiver 12b. The pin 46 is reengaged with the notch 43b, by which the projector head 11 is returned to the locked position.

The notch 35a permits the pin 36 to pass. The button 37 is pulled up. In response thereto, the shiftable arm 34 is shifted toward the locking lid 51. The pin 36 enters the notch 35a. As seen in FIG. 4, the triangular member 31 is swung clockwise about the shaft 32. The pin 33 is disengaged from the notch 29a, to release the stand 12 from being locked in the erected position.

The operation of the torsion coil spring 28 will now be described. The stand 12 is pressed down while the shiftable arm 34 is raised. The pin 33 responsively presses the front end 28b of the torsion spring 28 counterclockwise as seen in FIG. 4. The turns of the torsion spring 28 expand to a looser winding. The tightness of the torsion spring 28 is so lowered as to reduce the friction on the shaft 27. Because of this, the stand 12 can be manually swung down with the need to apply only reduced force.

The spring 28 is also useful in preventing the stand 12 from colliding with the Fresnel mirror 15, even if the stand 12 is accidentally released while folding it. Specifically, upon releasing the button 37, the shiftable arm 34 is drawn back and down by the lower spring. The triangular member 31 is swung counterclockwise, so as to cause the pin 33 to enter the arcuate recess b 29b and to bring the pin 33 into contact with the inside of the recess 29b. The pin 33 is thus stopped from pushing the front end 28b, which is released to allow the torsion spring 28 to return to its tighter winding. The friction of the spring 28 on the shaft 27 progressively increases, so as to stop the stand 12 slightly above the Fresnel mirror 15, thereby cushioning the fall of the stand 12.

When the user's one hand holds the stand 12 and the other hand pulls up the button 37, the stand 12 can be folded slowly and easily. The locking lid 51 is so pressed as to engage the claws 51a and 51b in the receiving recesses 25a and 25b. Therefore, the stand 12 is locked on the base table 10, so as to close the overhead projector to render it portable. Because the panels 58a and 58b engage the flanges 18a and 19a, the swingable plates 18 and 19 are kept closed and immovable when folded, and so preserve the thin and flat folded configuration of the projector for convenience of carrying and storage.

In the above embodiments, the Fresnel mirror 15 is mounted on the base table 10 swingably, but may be mounted removably on the base table 10. Although the illustrated Fresnel mirror 15 is eccentric, alternatively it can be centered. If an eccentric Fresnel mirror 15 is used and is mounted removably, the Fresnel mirror must be directed in the appropriate orientation before it can be utilized. In view of this, it is preferable to cut off one corner on a slant, and to form a correspondingly slanted receiving portion on the base table in order to position the corner marked by the slant in the correct orientation on the base table.

Although the present invention is illustrated applied to an overhead projector of the reflection type, it is also applicable to an overhead projector of the transmission type in which the original material to be projected is illuminated by a light source positioned below a transparent Fresnel lens. The present invention is further applicable to an image input apparatus which incorporates a video camera that picks up an image and supplies video signals of the image for a CRT display, a video tape recorder, or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A foldable optical apparatus comprising:
a base table having a stage adapted to receive original material;
an image forming head for forming an image of said original material on said stage, said image forming head including at least an optical system;
support means having first and second end portions, said first end portion being mounted on said base table for vertical swinging movement between an erected position and a folded position in which said support means overlies said stage, said image forming head being vertically swingably mounted on said second end portion; and
a locking structure for fixing said support means in said folded position, including:
a locking member swingably mounted on said second end portion of said support means in spaced relation to said image forming head;
a retaining claw formed at an end of said locking member;
a receiving portion formed on said base table for engagement with said retaining claw; and
release means for releasing said engagement between said retaining claw and said receiving portion.

2. A foldable optical apparatus as defined in claim 1, further comprising:
a light source within said image forming head for illuminating said original material
said stage including a Fresnel mirror which reflects light form said light source toward said optical system; and
said optical system including a projector lens for projecting said image onto a screen and a mirror for deflecting light from said projector lens.

3. A foldable optical apparatus as defined in claim 1, further comprising a head chamber formed in said support means and adapted to receive said image forming head, said image forming head being mounted on said support means for vertical swinging movement between an erected position and a folded position relative to said support means and being contained in said head chamber when in said folded position, and being supported above said stage when in said erected position.

4. A foldable optical apparatus as defined in claim 1, further comprising:
a second locking structure for fixing said support means in said erected position; and
externally operable second release means for releasing said second locking structure in order to allow said support means to swing from said erected position to said folded position.

5. A foldable optical apparatus as defined in claim 4, further comprising:
a third locking structure for fixing said image forming head in said erected position; and
externally operable third release means for releasing said third locking structure in order to allow folding said image forming head.

6. A foldable optical apparatus as defined in claim 5, further comprising:
a fourth locking structure for fixing said image forming head in a folded position; and
externally operable fourth release means for releasing said fourth locking structure in order to allow erecting said image forming head.

7. A foldable optical apparatus as defined in claim 2, further comprising a chamber for containing a plurality of original materials in said base table, said containing chamber being covered by said Fresnel mirror.

8. A foldable optical apparatus as defined in claim 1, further comprising at least one roller arranged on a bottom of said base table and close to an edge of said base table for facilitating transportation of said base table when an opposite edge of said base table is raised.

9. A foldable optical apparatus as defined in claim 8, wherein:
said roller is arranged opposite to said support means relative to said base table; and
said base table is provided with a grip member adjacent said support means.

10. A foldable optical apparatus as defined in claim 1, further comprising a pair of swingable plates arranged on two opposite sides of said base table to be swingable between open and closed positions, said swingable plates covering said stage when in said closed position, together with said support means as folded, and forming surfaces flush with an upper surface of said stage when in said open position.

11. A foldable optical apparatus as defined in claim 2, further comprising swingable plates on opposite sides of said base table which in closed position cover lateral sides of said Fresnel mirror and reduce the width of illuminating said original material to a predetermined smaller size.

12. A foldable optical apparatus as defined in claim 11, wherein said swingable plates are provided with respective flanges that support said plates with upper surfaces flush with an upper surface of said stage when said swingable plates are in open position.

13. A foldable optical apparatus as defined in claim 12, wherein a pair of lateral faces of said support means are so stepped as to rest on said flanges when said swingable plates are in said closed position while said support means is in said folded position.

14. A foldable optical apparatus as defined in claim 12, further comprising a pair of double hinge structures for supporting said swingable plates swingably on said base table, said double hinge structures allowing said swingable plates to make substantially half a revolution between said open and closed positions.

15. A foldable optical apparatus as defined in claim 1, further comprising a spring member for biasing said locking member in a direction of engagement of said retaining claw with said receiving portion.

16. A foldable optical apparatus as defined in claim 15, wherein said first release means is a manually pullable portion formed on said locking member, said retaining claw being disengaged from said receiving portion when said pullable portion is pulled against bias of said spring member.

17. A foldable optical apparatus as defined in claim 16, further comprising:
a recess portion formed in said support means and adapted to receive said locking member, said locking member being adapted to swing out of and into said recess portion; and
a stopper claw portion formed on said locking member and adapted to come into contact with an inside edge of said recess portion after said engaging claw portion is disengaged from said receiving portion, so as to limit outward swinging movement of said locking member in a direction away from said support means.

18. A foldable optical apparatus as defined in claim 6, further comprising means for disabling said second release means when said third locking structure fixes said image forming head in said erected position.

19. A foldable optical apparatus as defined in claim 18, wherein said second locking structure includes:
a first disk supported on a shaft through said first end portion of said support means;
a swingable member supported swingably on said first end portion of said support means;
a first pin secured to said swingable member; and
a first notch formed in said first disk for receiving and retaining said first pin when said support means is swung to said erected position.

20. A foldable optical apparatus as defined in claim 19, wherein said second release means includes:
a shiftable arm supported shiftably on said support means in a longitudinal direction thereof, means biassing said shiftable arm toward said first end portion of said support means, a portion of said shiftable arm on a side of said first end portion being secured swingably on said swingable member; and
an externally protruding first button integral with said shiftable arm for swinging said swingable member via said shiftable arm when slid toward said second end portion of said support means, so as to disengage said first pin from said first notch.

21. A foldable optical apparatus as defined in claim 20, wherein said fourth locking structure includes:
a second disk supported on a shaft through said second end portion inside said head chamber in said support means;
a first slidable member supported slidably on said image forming head in a longitudinal direction thereof;
a second pin secured to said first slidable member;
a spring member secured to said first slidable member for pressing said second pin against said second disk; and
a second notch formed in said second disk for receiving and retaining said second pin when said image forming head is swung to said folded position.

22. A foldable optical apparatus as defined in claim 21, wherein said fourth release means includes:
a second slidable member provided with said second pin and arranged slidably with said first slidable member;
a projection on said second slidable member;
a button extending through a wall of said support means for pressing said projection when said button is depressed while said image forming head is in said folded position, in order to slide said first slidable member so as to disengage said second pin from said second notch.

23. A foldable optical apparatus as defined in claim 22, wherein said third locking structure includes:
said second pin; and
a third notch formed in said second disk for receiving and retaining said second pin when said image forming head is swung to said erected position.

24. A foldable optical apparatus as defined in claim 23, wherein said third release means includes an externally protruding second button secured to said first slidable member for sliding said first slidable member when slid oppositely relative to said second end portion of said support means, so as to disengage said second pin from said third notch.

25. A foldable optical apparatus as defined in claim 24, wherein said release disabling means includes:
a third pin secured to said shiftable arm on a side of said second end portion of said support means; and
a third disk supported on said shaft through said second end portion inside said head chamber in said support means for coming into contact with said third pin in order to prevent said shiftable arm from shifting toward said second end portion of said support means, said third disk having a fourth notch which receives said third pin when said image forming head is swung to said folded position, in order to allow shifting said shiftable arm so as to enable said first button to operate.

26. An overhead projector comprising:
a base table having a stage on which original material is adapted to be placed;
a projector head for forming an image of said original material on said stage, said projector head including at least an optical system;
support means mounted for vertical swinging movement on said base table between an erected position and a folded position in which said support means overlies said stage, said projector head being swingably mounted on said support means; and
a pair of swingable plates arranged on opposite sides of said base table to swing between open and closed positions, said swingable plates covering said stage when in said closed position, together with said support means as folded, and forming surfaces flush with an upper surface of said stage when in said open position.

27. An overhead projector as defined in claim 26, further comprising a head chamber formed in said support means and adapted to receive said projector head, said projector head swinging between an erected position and a folded position relative to said support means and being received in said head chamber when in said folded position, and being supported above said stage when in said erected position.

28. An overhead projector, provided with a light source for illuminating transparent original material, and a projector head positioned above said original material and adapted to project an image of said original material onto a screen, said overhead projector comprising:
 a base table;
 a Fresnel mirror whereon said original material is adapted to be placed, said Fresnel mirror being mounted on said base table for reflecting light from said light source toward said projector head; and
 a containing chamber for containing a plurality of original materials in said base table, said containing chamber being covered by said Fresnel mirror.

29. An overhead projector as defined in claim 28, and means mounting said Fresnel mirror for vertical swinging movement on and relative to said base table thereby selectively to open and close said chamber.

30. An overhead projector comprising:
 a base table having a stage on which original material is adapted to be placed;
 a projector head for forming an image of said original material on said stage, said projector head including at least an optical system; and
 at least one roller on a bottom of one side of said base table for facilitating transportation of said base table while said bottom of said base table is tilted by being raised at a point spaced from said roller; and
 stationary high friction means on a side of said bottom of said base table opposite said one side of said base table; said projector resting on said at least one roller and on said stationary high friction means when said base table is lowered.

31. An overhead projector as claimed in claim 30, and a hand grip on an edge of said base table opposite the first-mentioned said side, thereby to facilitate tilting of said base table for transportation.

* * * * *